Sept. 22, 1970      M. L. ROWLEY      3,529,695

PORTABLE, ADJUSTABLE PORCH

Filed July 2, 1968      2 Sheets-Sheet 1

INVENTOR.
MAX L. ROWLEY

BY

ATTORNEYS

Sept. 22, 1970  M. L. ROWLEY  3,529,695
PORTABLE, ADJUSTABLE PORCH
Filed July 2, 1968  2 Sheets-Sheet 2

INVENTOR.
MAX L. ROWLEY
BY
ATTORNEYS

United States Patent Office 3,529,695
Patented Sept. 22, 1970

3,529,695
PORTABLE, ADJUSTABLE PORCH
Max L. Rowley, 10842 SE. 29th St.,
Oklahoma City, Okla. 73129
Filed July 2, 1968, Ser. No. 742,053
Int. Cl. E04g 1/30
U.S. Cl. 182—115                               17 Claims

ABSTRACT OF THE DISCLOSURE

A porch which can be dismantled to provide a plurality of compact sections for portability, and which can be quickly adjusted in height and accommodated to varying abnormalities in the terrain upon which it rests. The porch includes a plurality of adjustable leg assemblies which support a deck frame, which in turn supports a deck or flooring in a horizontal position. A plurality of step stringers which are adjustable in their distance of extension from the deck frame are secured to the deck frame by means of vice grip stringer support blocks which facilitate the quick detachment of the stringers from the deck frame, and permit the stringer effective length to be quickly varied as desired. The construction of the step stringers is such that a plurality of step treads can be quickly mounted on the stringers in substantially any position desired. Hand railings are provided above the floor or decking, and a hand rail is also extended over one side of the step stringers and the step treads supported by the stringers.

BACKGROUND OF THE INVENTION

Field of the invention

This invention relates to porch structures, and more particularly, to portable, adjustable porch structures adapted for use with mobile homes or trailer houses.

Brief description of the prior art

It has previously been proposed to provide for use with mobile homes, porch structures which can be folded into an out-of-the-way position when the home is being transported from one location to another. It has also been proposed to provide simple step or ladder structures which can be folded outwardly from moblie homes in a way so that the ladder will extend to or reach the ground, regardless of the distance of its point of attachment to the side of the trailer vehicle above the ground. A difficulty frequently encountered with the ladder structures is that the step treads which are rigidly mounted in the step structure are canted at various angles, depending upon the height at which the point of attachment of the step structure is located above the ground, making ascending and descending the steps dangerous, particularly in inclement weather.

BRIEF DESCRIPTION OF THE PRESENT INVENTION

The present invention provides a portable, adjustable porch structure which is especially well adapted for use with mobile homes or trailer houses, but which can also be used in other situations where it is desired to ascend and descend from one level to another in a safe manner. Broadly described, the present invention comprises a rectangular deck frame made up of a plurality of deck framing members, which deck frame is supported on a plurality of vertically extending, adjustable leg assemblies which extend both above and below the deck frame in order to engage the ground and to accommodate railings located above the deck frame. At their lower ends, the leg assemblies each include footing for supporting the deck frame a selected distance from the ground, with each of the footings being individually adjustable in its respective leg assembly so that the deck frame may be positioned horizontally above uneven terrain. Decking or flooring is secured across the top of te deck frame, and a plurality of suitable hand rails are secured between the upper ends of the leg assemblies above the flooring. The method of securement of the legs to the deck frame, and of the footings to the leg facilitates rapid and relatively simple assembly of the legs, deck frame and hand rails.

Extending downwardly and outwardly from the deck frame is an adjustable step assembly which includes a pair of parallel step stringers. The upper end portions of the step stringers are passed between a pair of parallel vice grip stringer support blocks and beneath one of the deck framing members. Near its lower end, each of the step stringers is secured to a vertically extending leveling shoe subassembly which can be adjusted in its position on the respective step stringer to adjust the height of the lower end of the step stringer above the ground. Extending horizontally between the pair of step stringers are a plurality of step treads which are slidably mounted on the step stringer by means of tread blocks which can be releasably secured in any desired position on the step stringers so as to determine the number and position of the step treads supported by the step stringers.

An important object of the invention is to provide a portable, adjustable porch particularly well adapted for use upon mobile homes and house trailers, which porch can be supported firmly upon very uneven terrain by multiple, horizontally spaced leg assemblies which rest upon the ground.

An additional object of the present invention is to provide a portable, adjustable porch structure for house trailers, which porch structure can be adjusted in its vertical dimension so that the flooring of the porch is substantially even with the sill of the doors of house trailers of varying sizes, and having their doors located at varying distances above the ground.

A further object of the invention is to provde a portable, adjustable porch structure which can be dismantled to provide a plurality of compact sections for purposes of storage and transport.

A further object of the invention is to provide a portable, adjustable porch structure which has an adjustable step assembly which can be made to accommodate a selected number of step treads, and can be adjusted in the angle of ascent of the steps, and the vertical distance which the step structure will effectively span.

Additional objects and advantages will become apparent as the following detailed description of the invention is read in conjunction with the accompanying drawings which illustrate the invention.

DETAILED DESCRIPTION OF A PREFERRED EMBODIMENT OF THE INVENTION

Figure 1:
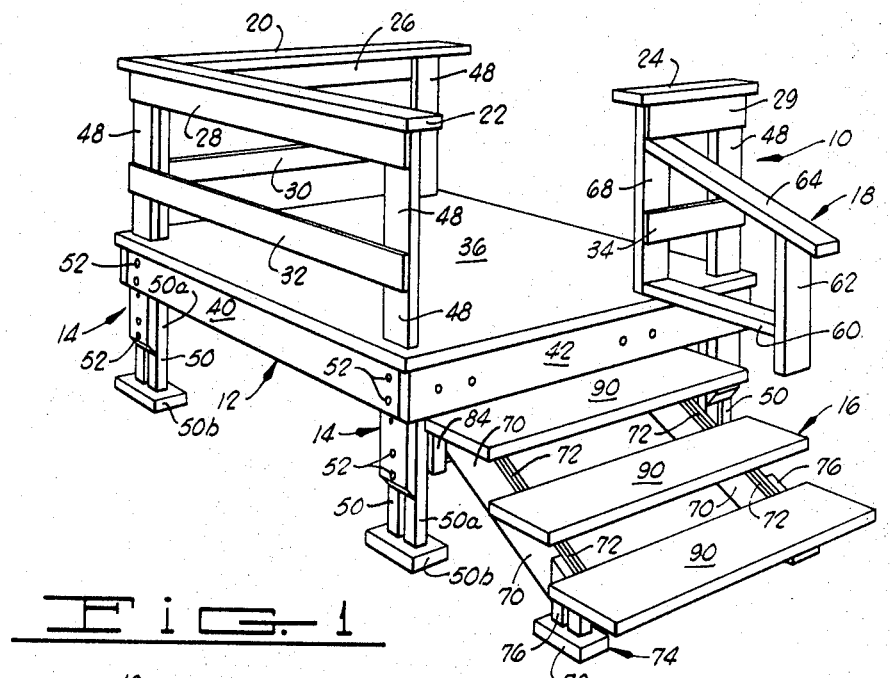
FIG. 1 is a perspective view of a portable, adjustable porch structure constructed in accordance with the present invention.
Figure 2:
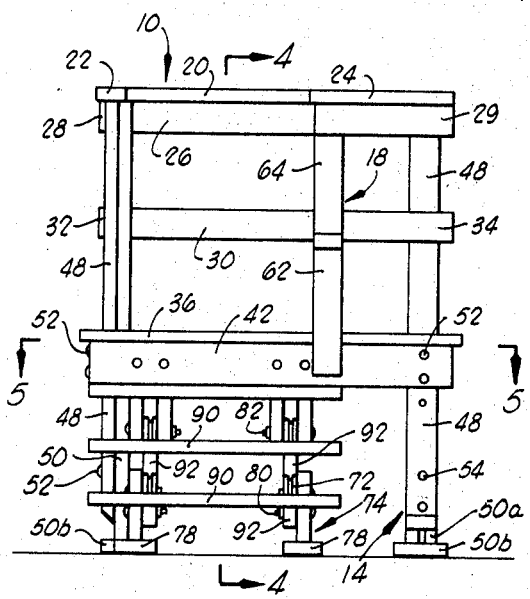
FIG. 2 is an end elevation view of the porch structure depicted in FIG. 1 as the structure appears when viewed from the side upon which the steps are located.
Figure 3:
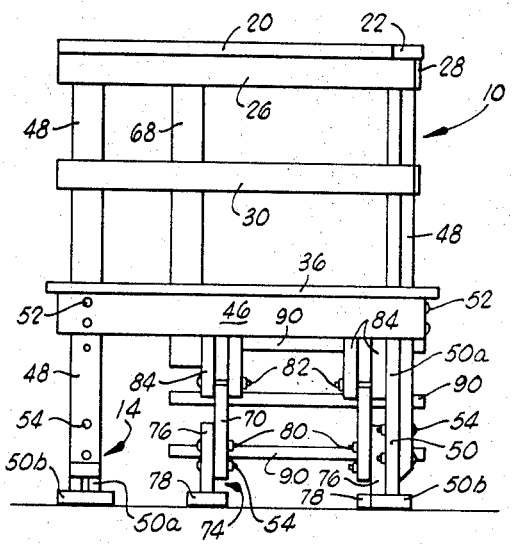
FIG. 3 is an end elevation view taken on the opposite side of the porch structure from that shown in FIG. 2.

Referring initially to FIG. 1 of the drawings, the adjustable porch structure of the invention is designated generally by reference numeral 10 and includes a deck frame designated generally by reference numeral 12 supported on a plurality of extensible or adjustable leg assemblies designated generally by reference numeral 14. The porch structure further includes a step assembly 16 which extends obliquely downwardly from one side of the deck frame 12. Finally, the porch structure includes a hand rail assembly 18, lateral hand rails 20, 22 and 24, supporting braces 26, 28 and 29 and a plurality of intermediate braces 30, 32 and 34. The deck frame 12 is covered by suitable decking or flooring 36.

Considering in detail the several subassemblies of the porch structure of the invention, the deck frame 12 includes a plurality of horizontally extending framing members 40, 42, 44 and 46 which are interconnected in a manner hereinafter described to form the rectangular deck frame 12. For the purpose of supporting the deck frame 12 at a vertical level which will align the flooring or decking 36 supported thereby at a level which is aligned with the sill of the door to a mobile home or house trailer, the extensible, adjustable leg assemblies 14 are provided, and each includes a hand rail riser 48 and a footing structure 50 which includes a vertically extending slotted member 50a and a foot member 50b secured to the lower end of the vertically extending slotted member 50a. Each hand rail riser 48 is secured by suitable bolts 52 to the end portions of intersecting framing members of the deck frame 12 so that when the portable adjustable porch structure of the invention is assembled, the deck frame 12 has its four corners secured to and supported by the hand rail risers 48 which are in turn secured to and supported upon the footing structures 50. It will be noted that the hand rail risers 48 each extend through a slot in the decking or flooring 36. It should also be pointed out that several vertically aligned bolt holes are provided in each of the hand rail risers 48 for accommodating the bolts 52 so that the vertical position along the hand rail risers at which the deck frame is secured may be adjusted. This then permits the effective height of the rail rails 20, 22 and 24 above the decking or flooring 36 to be adjusted.

Figures 5, 6:
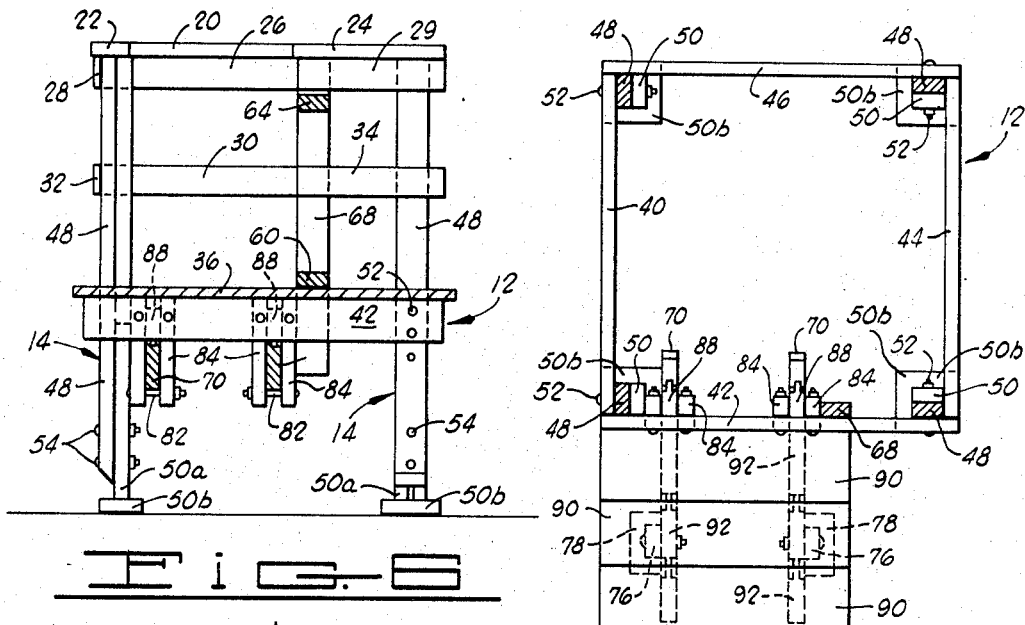
FIG. 5 is a sectional view taken along line 5—5 of FIG. 2.
FIG. 6 is a sectional view taken along line 6—6 of FIG. 4.
Figure 7:
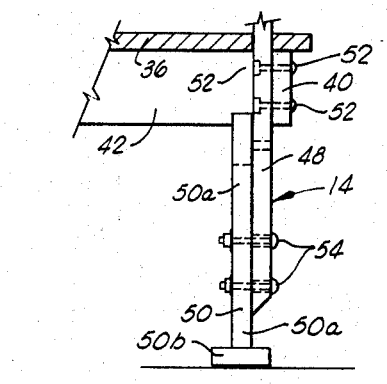
FIG. 7 is a detail view showing the extensible, adjustable leg assembly of the invention.

At its lower end, each of the hand rail risers 48 carries a plurality of bolt holes through which are extended a pair of bolts 54 which permit the hand rail risers to be adjustably secured to the slotted, vertically extending member 50a of the footing 50. The bolts are extended through the vertically extending slot located in the center of the member 50a and are used to draw this member tightly against the hand rail riser 48 when the footing 50 has been adjusted so as to place the foot 50b in contact with the ground and maintain the deck frame 12 in a horizontal plane, and at the height desired (that is, so as to be in horizontal alignment with the sill of the door to the mobile home). The adjustable securement of the footing 50 to the hand rail riser 48 and of the hand rail riser to one of the framing members 40 is best illustrated in FIG. 6 of the drawings.

From the description of the invention as thus far developed, it will be perceived that the portable, adjustable porch structure of the invention can be relatively easily assembled by the bolted connection of the framing members 40–46 to the hand rail risers 48, and by the adjusted securement of the footings 50 to the lower ends of the hand rail risers 48. With the hand rail risers 48, footings 50 and framing members 40–46 thus assembled, the flooring 36 may then be located above, and supported by, the deck frame 12. In the illustrated embodiment of the invention, the flooring or decking 36 is a single structural element and is located in the illustrated position simply by passing the upper ends of the hand rail risers 48 through suitable slots provided in the flooring. It is also possible, of course, to make the flooring of a plurality of separate structural elements in a manner well understood in the art. With the flooring in position, the horizontal intermediate braces 30, 32 and 34 may then be nailed or bolted in position between medial portions of the hand rail risers 48, and the supporting braces 26, 28 and 29 then secured in position. Finally, the hand rails 20, 22 and 24 are secured in position. The hand rail assembly 18 includes a horizontally extending foot brace 60, an end post 62 and a downwardly inclined hand rail 64. The foot brace 60 and hand rail 64 are each secured at one of their ends to a vertical supporting member 68 which can be secured in any suitable manner to the flooring 36 and framing member 42.

Figure 4:
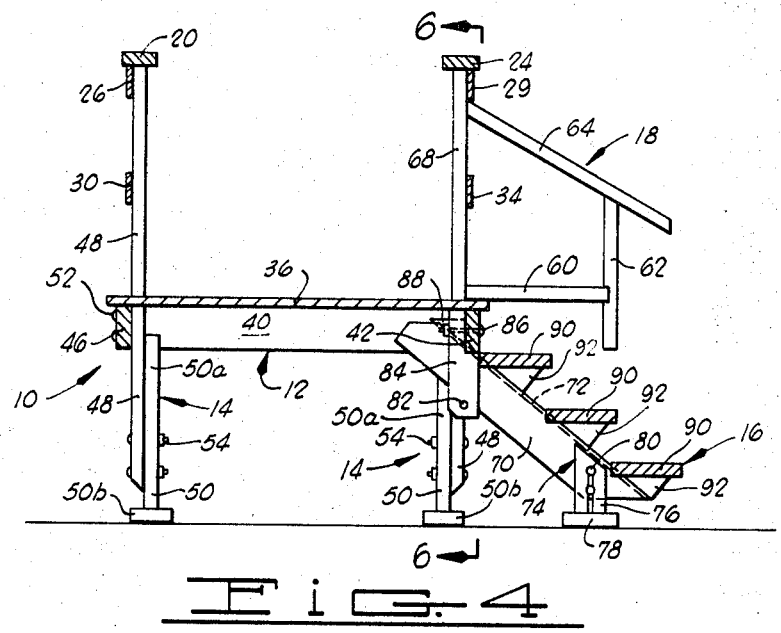
FIG. 4 is a sectional view taken along line 4—4 of FIG. 2.

An important feature of the invention is the step assembly desginated generally by reference numeral 16. The adjustable step assembly 16 includes a pair of step stringers 70 which are best illustrated in FIG. 4 of the drawings. Each of the step stringers 70 is characterized in having an upper longitudinal edge which is provided with a longitudinally extending slot 72 (see FIGS. 1 and 4) for a purpose hereinafter explained. At its lower end, each of the step stringers 70 is adjustably secured to a leveling shoe subassembly designated generally by reference numeral 74.

Each leveling shoe subassembly 74 includes a centrally slotted, vertically extending securing member 76 and a foot plate 78 which is secured to the lower end of the vertically extending securing member. Suitable bolts 80 are then extended through the slot in the securing member 76 and through apertures provided in the lower end portion of the respective step sringer 70. In order to adjust the height at which the lower end portion of the step assembly 16 is supported above the ground, it is then only necessary to loosen the bolts 80 and slide the leveling shoe subassembly 74 upwardly or downwardly in order to raise or lower the step assembly. When it is at the desired height, the bolts 80 are then retightened.

At its upper end, each of the step stringers 70 is extended beneath the framing member 42 and above a stringer support bolt or bar 82 which is passed through aligned apertures in a pair of parallel vice grip stringer support blocks 84. The vice grip stringer support blocks 84 are spaced from each other by a distance approximately equal to the thickness of the step stringers 70, and are secured at their upper ends by suitable bolts 86 to the framing member 42. The vice grip stringer support blocks 84 thus act as guides for the sliding movement of each of the step stringers 70 to permit the stringers to be extended away from the deck frame 12 or retracted toward and beneath the deck frame 12 so that the overall length of the step assembly 16 may be adjusted as desired.

To further aid in guiding the step stringers 70 during the described sliding movement, a pair of stringer guide blocks 88 are secured to the rear side of the framing member 42 between the upper ends of the vice grip stringer support blocks 84, and the position of these stringer guide blocks is best illustrated in FIGS. 4 and 5. The stringer guide blocks 88 are each triangular in configuration and carry along the lower side thereof, a tongue which mates with the groove 72 formed in the upper edge of each of the step stringers 70.

It will be perceived from the description of the method of mounting the step stringers 70 beneath the deck frame 12 that these stringers may be extended or retracted along an oblique line (with respect to the deck frame) in order to adjust the overall length of the step assembly 16, and to permit this assembly to be accommodated to uneven terrain upon which it may be desirable to place the porch structure of the invention. Adjustability in this respect is further enhanced by the inclusion of the adjustable leveling shoe subassembly 74. It will also be perceived that the detachment of the step assembly 16 from the remainder of the porch structure can be very quickly and easily effected simply by loosening the bolts 82, lifting upwardly to a slight extent on the lower end portions of the step stringers 70 and then pulling the step stringers outwardly until they are free of the vice grip stringer support blocks 84.

Adjustably positioned on the step stringers 70 are a plurality of step treads 90. Three of these step threads 90 are depicted in the illustrated embodiment of the invention and are mounted on the step stringers 70 by means of triangular shaped tread blocks 92. The tread blocks 92 have a lower edge which carries an elongated tongue at the center thereof, which tongue fits in and mates with the longitudinal groove 72 formed in the center of the upper side of each of the step stringers 70. It will be perceived that this construction permits each of the step treads 90 and its associated tread block 92 to be slid upwardly and downwardly on the step stringers 70. In aid of this interfitting, sliding arrangement, the back edge of each of the step treads 90 is cut away or notched to accommodate the upper edge portion of the stringers 70, and to provide additional support for each step tread. The described construction permits the number and location of the step treads 90 to be selectively determined, and to be correlated to the overall length of the step assembly 16, and to the height of the deck frame 12 and flooring 36 above the ground. When the step treads 90 and associated tread blocks 92 have been positioned at the desired location, the tread blocks 92 may be secured to the step stringers 70 by nailing or any other suitable means of securement.

From the foregoing description of the invention, it will be apparent that the portable, adjustable porch structure of the invention can be quickly assembled or dismantled so that, upon arrival at a location where it is desired to park the mobile home for living purposes, the porch 10 can be quickly set up, and the level of the flooring or decking 36 adjusted for perfect alignment with the still of the mobile home door. When the home is to be moved, the several parts of the porch structure can be quickly dismantled and, due to the relatively small size of the several subassemblies resulting from such dismantling, can be stored and transported in a relatively small space. The adjustability of the step assembly 16 permits the steps to be firmly supported on terrain which is uneven at any height to which the deck frame 12 and flooring 36 may be located, and permits the step treads 90 to be maintained level and horizontal in any position of the stringers 70.

Figure 8:
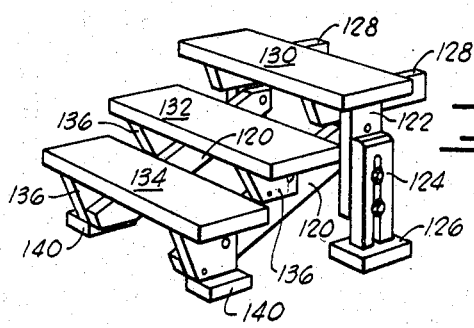
FIG. 8 is a perspective view of a modified step assembly which can be utilized in the porch structure of the invention.

In FIG. 8 of the drawings, there is illustrated a step assembly which can be utilized in place of the step assembly hereinbefore described, and which offers the advantage of greater adjustability when used in connection with the remainder of the porch structure, and which can also be utilized independently of the remainder of the porch structure for forming steps useful for ascending to the level of the sill of the doorway of a mobile home or the like should the user wish to use merely steps for access to the door. In this step assembly, a pair of step stringers 120 are provided and extend parallel to each other. The step stringers 120 are pivotally secured at their upper ends to a pair of downwardly depending leg posts 122, and these leg posts are in turn slidably secured to a pair of footings 124 which can be adjusted in their vertical relation to the respective leg posts, or can be removed entirely from the leg posts. At their lower ends, each of the footings 124 carries a support block 126 for supporting the upper end of the step assembly at an adjusted distance above the ground.

Secured to the upper ends of the leg posts 122 above the points of pivotal attachment of the respective step stringers 129 are a pair of top step tread runners 128 which extend horizontally from the leg posts 122, and which support on their upper sides, a top step tread 130. Spaced downwardly from the top step tread 130 are a pair of parallel lower step treads 132 and 134 and any number of similar step treads can be employed where required. The step treads 132 and 134 are secured to the stringers 120 by a pair of step tread blocks 136 secured to the lower side of each of the step treads 132 and 134, and also secured to the outside surface of each of the step stringers 120. The step tread blocks 136 which are located at the lowermost end of the parallel step stringers 120 and to the lowermost step tread 134 are secured at their lower ends to a pair of footing shoes 140 which extend parallel to each other and form a ground rest or support for the lower end of the step assembly.

trated in FIG. 8, the tread runners 128 are extended between the vice grip stringer support blocks 84 when the step assembly is to be used in conjunction with the remainder of the porch structure as hereinbefore described. The bolts 82 extending between the vice grip stringer support blocks 84 are then tightened so as to draw the vice grip stringer support blocks tightly against the step tread runners 128. With this arrangement, the footings 124 can be unbolted from the leg posts 122 and stored if desired, since their use is not required in this assembly. It will be noted that since the stringers 120 are, in this embodiment of the invention, pivotally secured to the leg posts 122, the angle at which they extend to the deck frame 12 can be varied as desired. After the stringers have been positioned so as to extend at the angle necessary to reach to the ground, the step treads 132 and 134 are secured thereto so that their upper surfaces are horizontal and the footing shoes 140 rest flatly on the ground.

When the step assembly depicted in FIG. 8 is to be utilized without the remainder of the porch structure for simply providing stepped access to the door or portal of the mobile home or house trailer, the step tread runners 128 are adjusted in their height by adjustment of the footings 124 on the leg posts 122 until the runners extend just beneath the floor of the mobile home. The top step tread 130 is then pushed toward the mobile home until it abuts flatly against the side thereof and is located immediately below the sill of the doorway of the home. Again the step stringers 120 are then adjusted in their angulation with respect to the leg posts 122 until their lower ends rest on the ground. The lower step treads 132 and 134 are then secured in position on the stringers in the manner illustrated in FIG. 8. It will thus be perceived that the step assembly of FIG. 8 can be usefully employed, either in combination with the remainder of the porch structure as hereinbefore described, or by itself for providing step access directly to the door opening in a mobile home or house trailer.

Although certain preferred embodiments of the invention have been herein described in order to illustrate one way in which the invention may be practiced, it is to be understood that various changes and innovations in the described structures can be effected without departure from the basic principles of the invention. All modifications of this type are therefore deemed to be circumscribed by the spirit and scope of the invention except as the same may be necessarily limited by the appended claims or reasonable equivalents thereof.

What is claimed is:
1. A step assembly comprising:
a pair of elongated, substantially parallel step stringers;
a pair of horizontally spaced, substantially parallel, vertically extending leg ports each having an upper end portion pivotally secured to one end of one of said step stringers;
a first, substantially horizontally extending step tread secured across the upper ends of said leg posts;
a vertically extending footing slidably and adjustably secured to each of said leg posts;
horizontally spaced step tread runners secured to the under side of said first step tread and projecting horizontally therefrom;
additional parallel step treads spaced vertically from each other and from said first step tread and spaced horizontally from each other and from said first step tread; and a pair of step tread blocks securing each of said additional step treads to said stringers.

2. An adjustable, portable porch structure comprising:
a deck frame;
flooring on said deck frame;
adjustable leg assemblies supporting said deck frame in a preselected, substantially horizontal plane;
a pair of elongated step stringers mounted on said deck frame and extending outwardly therefrom, each of said stringers being independently movable relative to said deck frame and said stringers being independently movable relative to each other for location out of parallelism with each other; and
a leveling shoe assembly adjustably secured to the outer end portion of each of said step stringers and extending downwardly from the respective stringer.

3. An adjustable, portable porch structure comprising:
a deck frame;
flooring on said deck frame;
adjustable leg assemblies supporting said deck frame in a preselected, substantially horizontal plane, each of said adjustable leg assemblies comprising:
a hand rail riser secured to said deck frame; and
a footing structure adjustably mounted on the lower end of said hand rail riser for vertical movement relative to said hand rail riser; and
an adjustable step assembly extending downwardly and outwardly from one side of said deck frame.

4. An adjustable, portable porch structure comprising:
a deck frame;
flooring on said deck frame;
adjustable leg assemblies supporting said deck frame in a preselected, substantially horizontal plane;
an adjustable step assembly extending downwardly and outwardly from one side of said deck frame; and
means for adjustably securing said deck frame to said adjustable leg assemblies to facilitate selection of the point of securement of said leg assemblies to the deck frame.

5. An adjustable, portable porch structure comprising:
a deck frame;
flooring on said deck frame;
adjustable leg assemblies supporting said deck frame in a preselected, substantially horizontal plane;
a pair of elongated step stringers extending at an acute angle downwardly from the substantially horizontal plane of said deck frame;
means movably supporting said stringers on said deck frame, and facilitating selective and independent adjustment of the position of said stringers relative to the substantially horizontal plane of said deck frame;
at least one step tread slidably positioned on, and extending across, said step stringer; and
a leveling shoe assembly adjustably secured to the outer end portion of each of said step stringers and extending downwardly from the respective stringer.

6. An adjustable, portable porch structure comprising:
a deck frame;
flooring on said deck frame;
adjustable leg assemblies supporting said deck frame in a preselected, substantially horizontal plane;
a pair of elongated, parallel step stringers extending at an acute angle downwardly from the substantially horizontal plane of said deck frame; and
means supporting said step stringers on said deck frame for sliding movement along the longitudinal axis of each stringer so that the angle made by each stringer with said substantially horizontal plane may be maintained constant during said sliding movement.

7. A porch assembly as defined in claim 1 wherein each adjustable leg assembly comprises:
a hand rail riser secured to said deck frame; and
a footing structure adjustably mounted on the lower end of said hand rail riser for vertical movement relative to said hand rail riser.

8. A porch assembly as defined in claim 7 and further characterized to include means for adjustably securing said deck frame to each of said hand rail risers.

9. An adjustable, portable porch structure comprising:
a deck frame;
flooring on said deck frame;
adjustable leg assemblies supporting said deck frame in a preselected, substantially horizontal plane, each of said adjustable leg assemblies comprising:
a vertically extending hand rail riser secured to said deck frame and extending above and below said deck frame; and
a footing structure adjustably mounted on the lower end of said hand rail riser below said deck frame for vertical movement relative to said hand rail riser;
a pair of elongated step stringers extending at an acute angle downwardly from the substantially horizontal plane of said deck frame;
means movably supporting said stringers on said deck frame and facilitating selective adjustment of the position of said stringers relative to the substantially horizontal plane of the deck frame; and
at least one step tread slidably positioned on, and extending across, said step stringers.

10. A porch structure as defined in claim 9 and further characterized to include hand rails extending between the upper ends of said hand rail risers and substantially parallel to said deck frame.

11. A porch structure as defined in claim 10 and further characterized to include means for adjustably securing said deck frame to each of said hand rail risers.

12. A porch structure as defined in claim 11 and further characterized to include a leveling shoe assembly adjustably secured to the outer end portion of each of said step stringers and extending downwardly from the respective stringer.

13. A porch structure as defined in claim 12 wherein said means for movably supporting said stringers on said deck frame comprises:
a first pair of spaced, substantially parallel, vice grip stringer support blocks secured to one side of said deck frame and extending downwardly therefrom;
first rigid securing means extending between the stringer support blocks in said first pair and below one of said step stringers for supporting said one step stringer and drawing said vice grip stringer support blocks in said first pair toward each other and against the opposite sides of said one step stringer;
a second pair of spaced, substantially parallel, vice grip stringer support blocks secured to the same side of said deck frame as said first pair of said support blocks and extending downwardly from said frame; and
second rigid securing means extending between the stringer support blocks in said second pair and below the other of said step stringers for supporting said other step stringer and drawing said vice grip stringer support blocks in said second pair toward each other and against the opposite sides of said other step stringer.

14. A porch structure as defined in claim 13 and further characterized to include a hand rail assembly supported on said deck frame and cantilevered over one side of said adjustable step assembly for providing a hand rail for use in traversing the steps of the porch structure.

15. A porch structure as defined in claim 9 wherein each of said step stringers has an elongated groove in one longitudinal edge thereof;
and wherein said porch structure is further characterized in having spaced tread blocks secured to the under side of each step tread, each of said tread blocks having a tongue thereon slidingly mating with the elongated groove in one of said step stringers.

16. An adjustable, portable porch structure comprising:
a deck frame;
flooring on said deck frame;
adjustable leg assemblies supporting said deck frame in a preselected, substantially horizontal plane;
a pair of elongated, substantially parallel step stringers;
a pair of horizontally spaced, vertically extending leg posts, each having an upper end portion pivotally secured to one end of one of said step stringers;
a vertically extending footing slidably and adjustably secured to each of said leg posts;
a first step tread secured across the upper end of said leg posts;
horizontally spaced step tread runners secured to the under side of said first step tread and projecting horizontally therefrom; and
additional parallel step treads secured to said stringers and spaced therealong from each other and from said first step tread.

17. A porch structure as defined in claim 16 and further characterized to include:
a support block secured to the lower end of each of said footings;
a pair of step tread blocks securing each of said additional step treads to said stringers; and
a footing shoe secured to the lower end of each of the step tread blocks in the lowermost pair of said step tread blocks for supporting one end of said step assembly on the ground.

References Cited
UNITED STATES PATENTS

| | | | |
|---|---|---|---|
| 1,018,232 | 2/1912 | Bessler | 182—106 |
| 2,974,746 | 3/1961 | Baker | 182—106 |
| 3,092,383 | 6/1963 | Dunn | 182—115 |
| 3,434,566 | 3/1969 | Miller | 182—88 |

REINALDO P. MACHADO, Primary Examiner

PO-1050
(5/69)

UNITED STATES PATENT OFFICE
CERTIFICATE OF CORRECTION

Patent No. __3,529,695__     Dated __September 22, 1970__

Inventor(s) __Max L. Rowley__

It is certified that error appears in the above-identified patent and that said Letters Patent are hereby corrected as shown below:

Column 5, line 38, "still" should be --sill--;

line 73, "129" should be --120--;

Column 6, line 13, at the beginning of the line, insert --In the described arrangement of the step assembly illus- --;

line 13, between "the" and "tread", insert --step--;

line 65, "ports" should be --posts--.

SIGNED AND
SEALED
DEC 8 - 1970

(SEAL)
Attest:

Edward M. Fletcher, Jr.
Attesting Officer

WILLIAM E. SCHUYLER, JR.
Commissioner of Patents